United States Patent
Channakeshava

(10) Patent No.: US 8,171,390 B1
(45) Date of Patent: May 1, 2012

(54) METHOD AND SYSTEM FOR VIEWING AND TRANSFERRING DATA BETWEEN DOCUMENTS

(75) Inventor: Girish Mallenahally Channakeshava, Karnataka (IN)

(73) Assignee: Intuit Inc., Mountain View, CA (US)

( * ) Notice: Subject to any disclaimer, the term of this patent is extended or adjusted under 35 U.S.C. 154(b) by 336 days.

(21) Appl. No.: 12/603,842

(22) Filed: Oct. 22, 2009

(51) Int. Cl.
*G06F 3/048* (2006.01)
(52) U.S. Cl. ......... 715/221; 715/205; 715/234; 715/769
(58) Field of Classification Search .................. 715/200, 715/201, 204, 205, 221, 224, 225, 226, 229, 715/234, 253, 255, 256, 273, 700, 724, 760, 715/762, 769, 770, 771, 773, 862, 863, 864, 715/867, 966
See application file for complete search history.

(56) References Cited

U.S. PATENT DOCUMENTS

| | | | |
|---|---|---|---|
| 5,765,156 A * | 6/1998 | Guzak et al. | 707/756 |
| 7,559,033 B2 * | 7/2009 | Boss et al. | 715/770 |
| 7,574,667 B2 * | 8/2009 | Marion et al. | 715/770 |
| 7,607,102 B2 * | 10/2009 | Ording et al. | 715/770 |
| 7,689,925 B2 * | 3/2010 | Hahn et al. | 715/770 |
| 2003/0184587 A1 * | 10/2003 | Ording et al. | 345/769 |
| 2005/0091603 A1 * | 4/2005 | Chen et al. | 715/770 |
| 2005/0172241 A1 * | 8/2005 | Daniels et al. | 715/770 |
| 2009/0271806 A1 * | 10/2009 | McDonald et al. | 719/329 |

OTHER PUBLICATIONS

"IBM Technical Disclosure Bulletin" vol. 37, No. 7, Jul. 1994, pp. 1-2.*

* cited by examiner

*Primary Examiner* — Maikhanh Nguyen
(74) *Attorney, Agent, or Firm* — McKay and Hodgson, LLP; Philip McKay; Sean P. Lewis

(57) ABSTRACT

A method and system for viewing and transferring data between documents whereby source data a user desires to transfer from a source document to the one or more data fields and/or locations of a given target electronic form, or other target document, is transformed into clipboard content data. The clipboard content data is then linked to a selected cursor/pointer, or other user interface device, such that the clipboard content data can be displayed along with the target electronic form, or other target document, on the same user interface screen, wherever the selected cursor/pointer is located on the user interface screen. This allows the user to quickly view and transfer the source data to the target electronic form, or other target document, within the same given user interface screen, and within a common display context, without having to toggle between the target electronic form, or other target document.

16 Claims, 7 Drawing Sheets

| | A | B | C | D | E | F | G |
|---|---|---|---|---|---|---|---|
| 1 | Application Docket Number | Inventor Last Name | Inventor DOB | Inventor Citizenship | Drafting Date Due | Filing Due Date | Application Status |
| 2 | 12341 | Girish | 11/20/1980 | India | 10/1/2009 | 12/1/2009 | Filed on 11/1/2009 |
| 3 | 12342 | Jones | 5/23/1978 | USA | 10/2/2009 | 12/2/2009 | Pending |
| 4 | 12343 | McKay | 4/23/1982 | UK | 10/3/2009 | | |
| 5 | 12344 | Cook | 12/14/1970 | Canada | 10/4/2009 | | |
| 6 | 12345 | Smith | 7/25/1965 | USA | 10/5/2009 | | |

FIG. 4

METHOD AND SYSTEM FOR VIEWING AND TRANSFERRING DATA BETWEEN DOCUMENTS

BACKGROUND

Currently, when a user desires to transfer source data from one or more source documents to data fields in an electronic form, or other target document, the user typically must first access the source document and then either copy or memorize the desired source data associated with a single and specific data entry field of the target electronic form, or other target document, and then toggle over to access the target electronic form, or other target document, and then manually enter or paste the desired source data associated with the single and specific data entry field of the target electronic form, or other target document, into the single and specific data entry field of the target electronic form, or other target document. Then this process must be repeated for each target electronic form data entry field, or other target document.

Since many target electronic forms or documents include numerous data entry fields, the process described above is often: very time consuming, and therefore labor intensive; a common source of human error; very processor and computing system power intensive; and is often a significant source of user frustration and job dissatisfaction. In addition, since, using the conventional toggle-memorize/cut-toggle-enter/paste process described above, the user must constantly toggle between documents, the user often loses context and the ability to track what data has been entered/updated and what data is old.

In an effort to alleviate the significant issues associated with the conventional toggle-cut-toggle-paste process described above, several automated data mapping schemes have been created and implemented in data intensive applications and industries. However, automated mapping systems typically do not provide any significant user control, or input, and do not allow the user to select what data is transferred/mapped. Consequently, since automated mapping systems are basically machine directed systems, and therefore lack cognitive reasoning beyond their programmed process, these automatic mapping systems: are typically highly customized and designed specific source documents and specific target forms and documents, thereby often making this an expensive and high maintenance option; are relatively inflexible and lack the ability to tolerate/accommodate even insignificant variations in field placement and/or field nomenclature in either the source documents or the target electronic form or document; are highly susceptible to machine errors and/or human errors, and often propagate these errors significantly before they are discovered; and are often unable to cope with situations where there is redundant, seemingly contradictory, or irregular, data. As noted above, these weaknesses in automated mapping systems are often due to the fact these systems largely by-pass the user, i.e., do not provide for user selection of data to be mapped, significant user input in the process, or user control over the process.

Clipboarding is another method for transferring source data from one or more source documents to a target electronic form, or other target document. A Clipboard is a block of system memory that can be used to store data temporarily. Multiple memory objects can be stored in the clipboard. Memory objects on the clipboard can be in any data format, called a clipboard format. Each format is identified by an unsigned integer value. Once the data has been copied to the clipboard it can be pasted into another location.

Clipboarding can be a useful tool, however, there are some problems associated with it. For instance, currently clipboard content data is typically not automatically displayed to the user prior to the user pasting the clipboard content data into the target form, or other target document. In addition, in the few cases where the clipboard content data can be viewed prior to the user pasting the clipboard content data into the target form or other target document, the placement of the clipboard content data display is not easily selected and/or modified by the user, i.e., if displayed at all, the clipboard content data display is typically a side bar displayed in the same static and pre-determined location and even then, usually only after the user specifically activates the side bar.

In addition, while some currently available clipboard systems do provide limited cut/copy/paste capability, currently available clipboard systems only allow the entire clipboard content to be transferred at once, and, as noted above, often without providing a user viewing capability. As a result, currently available clipboard systems work reasonably well for transferring a single data element, such as a name, but are not very useful if you want to move multiple data elements to multiple locations in a target form, or other target document, such as a name, address, phone number etc. This is because using currently available clipboard systems every time you paste, the entire set of data, including multiple data elements, will be pasted/transferred at once to whatever data filed and/or location is selected in the target form, or other target document. For instance, currently available clipboard systems are not well suited to transferring multiple data elements such as a first name, last name, age, city, zip, state, country from a source document to respective form fields, and/or locations, in a target form, or other target document because when the clipboard content data is pasted in a given field, such as the first name, last name, age, city, zip, state, country, will be transferred to the First Name field.

In addition using currently available clipboard systems, when the copy function is activated a copy of the current selection is obtained on the clipboard but all the previous content of the clipboard is destroyed.

As a result of the situation described above, a user desiring to transfer source data from one or more source documents to data fields in an electronic form, or other target document, must typically choose between using the highly inefficient, but arguably reliable and flexible, conventional toggle-memorize/cut-toggle-enter/paste process described above, the automated, but largely inflexible and often unreliable, automated mapping systems currently available, and/or currently available clipboard systems having the shortcomings discussed above. Consequently, whichever choice the user makes, currently available methods and systems for transferring source data from one or more source documents to data fields in an electronic form, or other target document, leave much to be desired.

SUMMARY

In accordance with one embodiment, a method and system for viewing and transferring data between documents includes a process for viewing and transferring data between documents whereby source data a user desires to transfer from a source document to the one or more data fields and/or locations of a given target electronic form, or other target document, is transformed into clipboard content data. The clipboard content data is then linked to a selected cursor/pointer, or other user interface device, such that the clipboard content data can be displayed along with the target electronic form, or other target document, on the same given user interface screen, wherever the selected cursor/pointer is located on the user interface screen. This allows the user to quickly view and transfer the source data to the target electronic form, or other target document, within the same given user interface screen, and within a common display context, without having to toggle between the target electronic form, or other target document.

In one embodiment, a user accesses a source document that includes source data the user desires to transfer to the one or more data fields and/or locations of a given target electronic form, or other target document, or other target document.

In one embodiment, the user accesses the source document that includes source data the user desires to transfer to the one or more data fields of the given target electronic form, or other target document, via a computing system that is any computing system and/or server system, such as, but not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices.

In one embodiment, the user accesses the source document that includes source data the user desires to transfer to the one or more data fields of the given target electronic form, or other target document, via a computer readable medium, and/or any other computer program product. In one embodiment, the given target electronic form, or other target document, is accessed and displayed on a user computing system via any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems. In one example, a user accesses the source document via any webpage and/or a web-based system, or any site on a public network such as the Internet.

In one embodiment, the source document is any document in any one of numerous formats such as, but not limited to: a Microsoft word document; a Microsoft Excel spreadsheet; Invoice documents; a notepad; a resume document; an e-mail signature; payroll documents; employee listings; or any other document containing the desired source data.

In one embodiment, the source document is any document created by, or in association with, a computing system implemented data management system, such as, but not limited to: computing system implemented accounting and/or invoicing systems, packages, programs, modules, or applications; computing system implemented financial management systems, packages, programs, modules, or applications; computing system implemented financial management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications.

In one embodiment, the user selects a portion of the source data in the source document that the user desires to transfer to the one or more data fields and/or locations of the given target electronic form, or other target document, or other target document.

In one embodiment, when the user selects a portion of the source data in the source document that the user desires to transfer to the one or more data fields of the given target electronic form, or other target document, the entire desired portion of source data is then copied from the source document in a single user selection action initiated by the user via any user interface device such as, but not limited to: a keyboard, a mouse, a touchpad, voice recognition software, or any other device and/or system capable of providing user input to a computing system and/or for translating user actions into computing system operations, whether available or known at the time of filing or as developed later.

In one embodiment, the selected portion of the source data in the source document is transformed into clipboard content data using one of more processors associated with a computing system.

In one embodiment, the clipboard content data is stored in any one of one of more data formats desired, and/or as discussed herein, and/or as known in the art at the time of filing, and/or as developed after the time of filing.

In one embodiment, the clipboard content data is stored in whole, or in part, in a memory system, database, cache memory, and/or any main memory or mass memory, associated with a computing system. In one embodiment, the clipboard content data is stored in whole, or in part, in any computing system and/or server system, or other device, in another location, or on/in a computer readable medium, and/or any other computer program product. In one embodiment, the clipboard content data is stored in whole, or in part, on a webpage, in a web-based system, or on a public network such as the Internet.

In one embodiment, the user accesses a given target electronic form, or other target document, and/or transfer locations and the given target electronic form, or other target document, is displayed on a given user interface screen of a display device associated with a computing system.

In one embodiment, the given target electronic form, or other target document, is accessed and displayed on a user computing system. In one embodiment, the given target electronic form, or other target document, is accessed and displayed on a user computing system through a web-browser.

In one embodiment, the given target electronic form, or other target document, is accessed and displayed on a user computing system by accessing a provider computing system. In one embodiment, the given target electronic form, or other target document, is accessed and displayed on a user computing system by accessing a provider computing system that is a web-server and/or a web-based system.

In one embodiment, the given user interface screen of the display device is associated with a computing system that is any computing system and/or server system, such as, but not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices.

In one embodiment, the given target electronic form, or other target document, is accessed and displayed on a user computing system by accessing any other electronic device, and/or via a computer readable medium, and/or any other computer program product. In one embodiment, the given target electronic form, or other target document, is accessed and displayed on a user computing system via any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems. In one example, a user accesses the source document via any webpage and/or a web-based system, or any site on a public network such as the Internet.

In one embodiment, the user activates a cursor/pointer and clipboard content linking property through the given user interface screen.

In one embodiment, the cursor/pointer and clipboard content linking property is an operating system cursor/pointer property/feature accessed via a pull-down menu or by any other access means.

In one embodiment, the cursor/pointer and clipboard content linking property is an operating system clipboard property/feature accessed via a pull-down menu or by any other access means.

In one embodiment, the user activates the cursor/pointer and clipboard content linking property through the given user interface screen using a user interface device such as, but not limited to: a keyboard, a mouse, a touchpad, voice recognition software, or any other device and/or system capable of providing user input to a computing system and/or for translating user actions into computing system operations, whether available or known at the time of filing or as developed later.

In one embodiment, the user activates the cursor/pointer and clipboard content linking property through the given user interface screen by activating an icon or other symbol displayed on the given user interface screen. In one embodiment, the user activates the cursor/pointer and clipboard content linking property through the given user interface screen by activating an icon or other symbol displayed on the given user interface screen as part of a web-browser application.

In one embodiment, the user activates the cursor/pointer and clipboard content linking property through the given user interface screen via a user action and a user interface device such as, but not limited to: a keyboard, a mouse, a touchpad, voice recognition software, or any other device and/or system capable of providing user input to a computing system and/or for translating user actions into computing system operations, whether available or known at the time of filing or as developed later.

In one embodiment, the clipboard content data is then linked to the selected cursor/pointer such that the clipboard content data can be displayed along with the given target electronic form, or other target document, on the same given user interface screen, wherever the selected cursor/pointer is located on the given user interface screen.

In one embodiment, the user selected portion of the source data in the source document is parsed into individual data elements so that, in one embodiment the clipboard is dynamic and that user can efficiently use individual data elements of the clipboard content data one by one.

In one embodiment, the selected source data is parsed into individual data elements, and/or gathered into individual data elements that consist of groupings of related data, using a processor and/or instructions provided by the user and/or the provider of the process for viewing and transferring data between documents.

In one embodiment, the user parsed selected portion of the source data in the source document is transformed into clipboard content data that is also parsed into the individual data elements.

In one embodiment, the clipboard content data is parsed into individual data elements, and/or gathered into individual data elements that consist of groupings of related data, using a processor and/or instructions provided by the user and/or the provider of the process for viewing and transferring data between documents.

In one embodiment, the user then accesses the given target electronic form, or other target document and/or transfer locations via any of the means, mechanism, processes or procedures discussed above, and/or as known in the art at the time of filing, and/or as developed after the time of filing.

In one embodiment, the user activates the cursor/pointer and clipboard content linking property through the given user interface screen via any of the means, mechanism, processes or procedures discussed above, and/or as known in the art at the time of filing, and/or as developed after the time of filing.

In one embodiment, the parsed clipboard content data is then linked to the selected cursor/pointer such that the parsed clipboard content data can be displayed along with the given target electronic form, or other target document, on the same given user interface screen, wherever the selected cursor/pointer is located on the given user interface screen via any of the means, mechanism, processes or procedures discussed above, and/or as known in the art at the time of filing, and/or as developed after the time of filing.

In one embodiment, the individual data elements of the parsed clipboard content data are then displayed on the same given user interface screen as the given target electronic form, or other target document. In one embodiment, the individual data elements of the parsed clipboard content data are displayed in a clickable/draggable source data sub-display taking the form of a data clipboard.

In one embodiment, the user then selects a given individual data element of the parsed clipboard content data associated with a given one of the one or more data fields and/or locations of the given target electronic form, or other target document, through the given user interface display and drags and drops the selected given individual data element of the parsed clipboard content data associated with a given one of the one or more data fields and/or locations of the given target electronic form, or other target document, into the given one of the one or more data fields and/or locations of the given target electronic form, or other target document, in one embodiment, without leaving the user interface display screen. This process is then repeated for each individual data element of the parsed clipboard content data; thereby transforming the given target electronic form, or other target document, into an at least partially filled-in electronic form, or other document.

In one embodiment, the user selects a given individual data element of the parsed clipboard content data associated with a given one of the one or more data fields of the given target electronic form, or other target document, through the given user interface display using a user interface device such as, but not limited to: a keyboard, a mouse, a touchpad, voice recognition software, or any other device and/or system capable of providing user input to a computing system and/or for translating user actions into computing system operations, whether available or known at the time of filing or as developed later.

In one embodiment, the user pastes the given individual data element of the parsed clipboard content data associated with a given one of the one or more data fields of the given target electronic form, or other target document, into the associated given one of the one or more data fields of the given target electronic form, or other target document, through the given user interface display using a user interface device such as, but not limited to: a keyboard, a mouse, a touchpad, voice recognition software, or any other device and/or system capable of providing user input to a computing system and/or for translating user actions into computing system operations, whether available or known at the time of filing or as developed later.

As a specific example, in one embodiment, the user positions the cursor/pointer on a given one of the one or more data fields of the given target electronic form, or other target document, such as "first name" and performs paste operation (Ctrl+V). In one embodiment, the clipboard content data representing the first name is then filled in the given target electronic form, or other target document, and the clipboard content data representing the first name is removed from clipboard.

Continuing with this specific example, in one embodiment, the user positions the cursor/pointer on a given one of the one or more data fields of the given target electronic form, or other target document, such as "last name" and performs paste operation (Ctrl+V). In one embodiment, the clipboard content data representing the last name is then filled in the given target electronic form, or other target document, and the clipboard content data representing the last name is removed from clipboard.

Continuing with this specific example, in one embodiment, the user positions the cursor/pointer on a given one of the one or more data fields of the given target electronic form, or other target document, such as "company name" and performs paste operation (Ctrl+V). In one embodiment, the clipboard content data representing the company name is then filled in the given target electronic form, or other target document, and the clipboard content data representing the company name is removed from clipboard.

Continuing with this specific example, in one embodiment, the user positions the cursor/pointer on a given one of the one or more data fields of the given target electronic form, or other target document, such as "age" and performs paste operation (Ctrl+V). In one embodiment, the clipboard content data representing the age is then filled in the given target electronic form, or other target document, and the clipboard content data representing the age is removed from clipboard.

Continuing with this specific example, in one embodiment, the user positions the cursor/pointer on a given one of the one or more data fields of the given target electronic form, or other target document, such as "city" and performs paste operation (Ctrl+V). In one embodiment, the clipboard content data representing the city is then filled in the given target electronic form, or other target document, and the clipboard content data representing the city is removed from clipboard.

Continuing with this specific example, in one embodiment, the user positions the cursor/pointer on a given one of the one or more data fields of the given target electronic form, or other target document, such as "zip" and performs paste operation (Ctrl+V). In one embodiment, the clipboard content data representing the zip is then filled in the given target electronic form, or other target document, and the clipboard content data representing the zip is removed from clipboard.

Continuing with this specific example, in one embodiment, the user positions the cursor/pointer on a given one of the one or more data fields of the given target electronic form, or other target document, such as "state" and performs paste operation (Ctrl+V). In one embodiment, the clipboard content data representing the state is then filled in the given target electronic form, or other target document, and the clipboard content data representing the state is removed from clipboard.

Continuing with this specific example, in one embodiment, the user positions the cursor/pointer on a given one of the one or more data fields of the given target electronic form, or other target document, such as "country" and performs paste operation (Ctrl+V). In one embodiment, the clipboard content data representing the country is then filled in the given target electronic form, or other target document, and the clipboard content data representing the country is removed from clipboard.

In one embodiment, the data transfer process described above is repeated for each individual data element of the parsed clipboard content that is associated with at least one of the one or more data fields of the given target electronic form, or other target document. In addition, in one embodiment, the drag and drop process described above can be repeated for multiple target electronic forms, or other target documents. Consequently, the user can fill in specific fields of multiple target electronic forms or other target documents without having to toggle between multiple source documents and/or multiple target electronic forms, or other target documents, and without having to individually cut and paste each source document field data and paste it into the each relevant target electronic form, or other target document, field manually.

Using embodiments of the method and system for viewing and transferring data between documents disclosed herein, a user can copy all desired source data from one or more source documents in a single action. Then the desired source data from the one or more source documents is transformed into clipboard content data and the clipboard content data is linked to a selected cursor/pointer, or other user interface device, such that the clipboard content data can be displayed along with the target electronic form, or other target document, on the same given user interface screen, wherever the selected cursor/pointer is located on the user interface screen, to allow the user to quickly view and transfer the source data to the target electronic form, or other target document, within the same given user interface screen, and within a common display context, without having to toggle between the target electronic form, or other target document. Consequently, using embodiments of the method and system for viewing and transferring data between documents disclosed herein, a user desiring to transfer source data from one or more source documents to data fields in an electronic form, or other target document, can reliably and efficiently transfer data between documents, while at the same time asserting considerable control over what data is transferred; and all from a single interface screen and within a common display context.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 4 is an illustrative example of a source document, including source data selected by a user in accordance with one embodiment;

Figure 1:
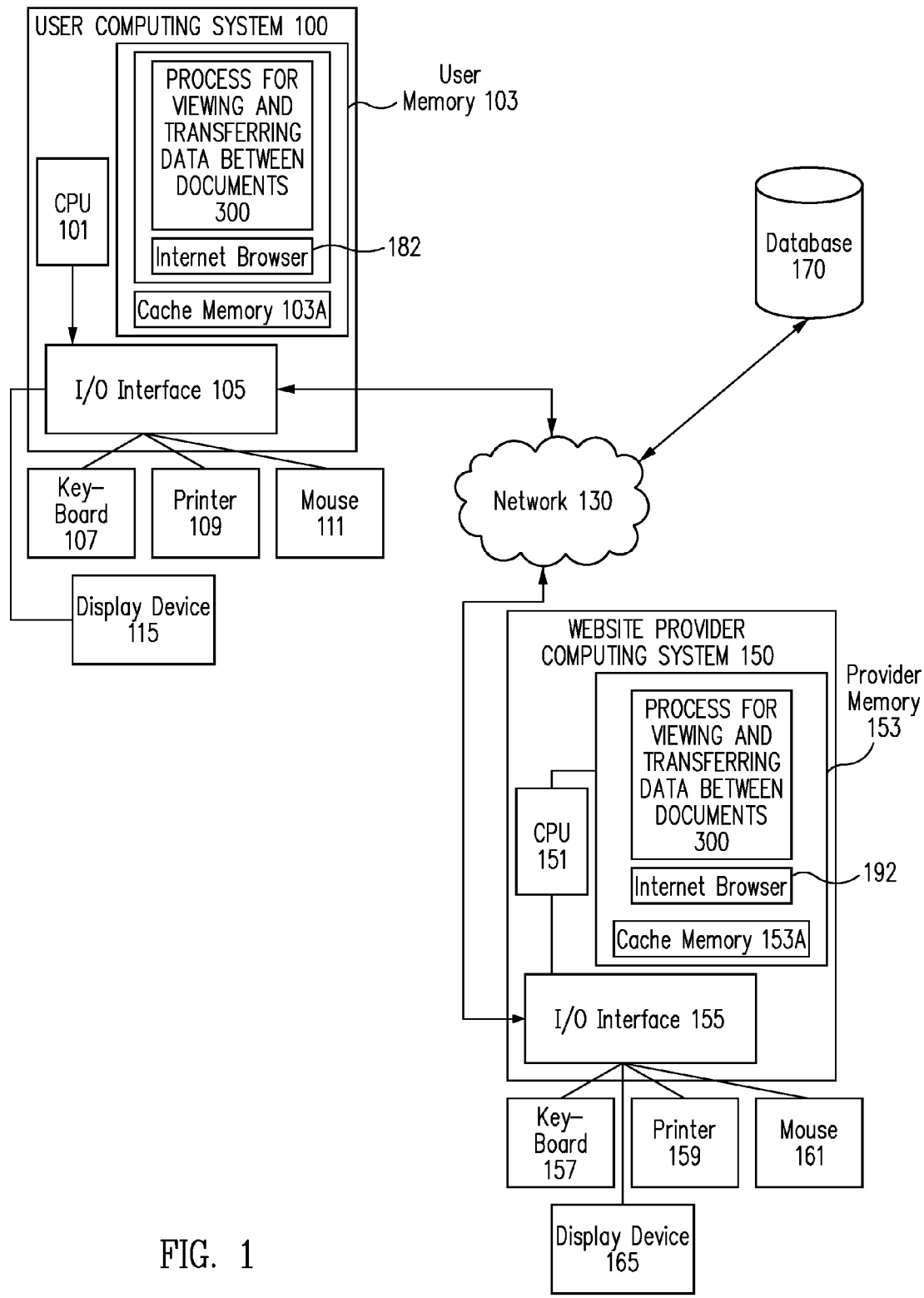
FIG. 1 is a block diagram of an exemplary hardware architecture for implementing one embodiment including a user computing system, a website provider computing system, a database, and a network.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for viewing and transferring data between documents includes a process for viewing and transferring data between documents whereby source data a user desires to transfer from a source document to the one or more data fields and/or locations of a given target electronic form, or other target document, is transformed into clipboard content data. The clipboard content data is then linked to a selected cursor/pointer, or other user interface device, such that the clipboard content data can be displayed along with the target electronic form, or other target document, on the same given user interface screen, wherever the selected cursor/pointer is located on the user interface screen. This allows the user to quickly view and transfer the source data to the target electronic form, or other target document, within the same given user interface screen, and within a common display context, without having to toggle between the target electronic form, or other target document.

FIG. 1 is a block diagram of an exemplary hardware architecture for implementing one embodiment of a system and method for viewing and transferring data between documents, such as exemplary process 300 (FIG. 3) discussed herein, that, returning to FIG. 1, includes: a user computing system 100, e.g., a first computing system; a website provider computing system 150, e.g., a second computing system; and a database 170, all operatively coupled by a network 130.

As seen in FIG. 1, user computing system 100 typically includes one or more central processing units, CPU(s) 101, an input/output (I/O) interface 105, and a user memory 103, including cache user memory 103A. As discussed in more detail below, in one embodiment, user memory 103 includes all, or part, of instructions and data associated with a process for viewing and transferring data between documents 300 (see FIG. 3).

Returning to FIG. 1, user computing system 100 may further include standard user interface devices such as a keyboard 107, a mouse 111, a printer 109, and a display device 115, as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

In one embodiment, user computing system 100 also includes an Internet browser capability 182 that, in one embodiment, includes a search engine (not shown) and is stored, in whole, or in part, in user memory 103. In one embodiment, at least part of process for viewing and transferring data between documents 300 (see FIG. 3) is provided through, and/or associated with, Internet browser capability 182.

In one embodiment, user computing system 100 is a computing system accessible by one or more users. In one embodiment, user computing system 100 is used, and/or accessible, by another computing system, such as website provider computing system 150 (discussed below).

In one embodiment, user computing system 100 is representative of multiple user computing systems. In one embodiment, user computing system 100 is representative of a webpage, or web-based system. In one embodiment, user computing system 100 is a server computing system. In various embodiments, user computing system 100 is any computing system as defined herein and/or as known in the art at the time of filing and/or as developed thereafter, that includes components that can execute all, or part, of a process for viewing and transferring data between documents in accordance with at least one of the embodiments as described herein.

As also seen in FIG. 1, website provider computing system 150 typically includes one or more central processing units, CPU(s) 151, an input/output (I/O) interface 155, and a provider memory 153, including cache memory 153A. As discussed in more detail below, in one embodiment, provider memory 153 includes all, or part, of instructions and data associated with a process for viewing and transferring data between documents 300 (see FIG. 3).

Returning to FIG. 1, website provider computing system 150 may further include standard user interface devices such as a keyboard 157, a mouse 161, a printer 159, and a display device 165, as well as, one or more standard input/output (I/O) devices (not shown), such as a compact disk (CD) or Digital Video Disc (DVD) drive, floppy disk drive, or other digital or waveform port, or other device capable of inputting data to, and outputting data from, website provider computing system 150, whether available or known at the time of filing or as later developed.

In one embodiment, website provider computing system 150 also includes an Internet browser capability 192 that, in one embodiment, includes a search engine (not shown) and is stored, in whole, or in part, in provider memory 153. In one embodiment, at least part of process for viewing and transferring data between documents 300 (see FIG. 3) is provided through, and/or associated with, Internet browser capability 192.

In one embodiment, website provider computing system 150 is used, and/or accessible, by another computing system, such as user computing system 100.

In one embodiment, website provider computing system 150 is representative of multiple website provider computing systems. In one embodiment, website provider computing system 150 is representative of a webpage, or web-based system. In one embodiment, website provider computing system 150 is a server computing system. In one embodiment, website provider computing system 150 is a web-server computing system. In various embodiments, website provider computing system 150 is any computing system as defined herein and/or as known in the art at the time of filing and/or as developed thereafter, that includes components that can execute all, or part, of a process for viewing and transferring data between documents in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100 and/or 150, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for viewing and transferring data between documents.

In one embodiment, data associated with a process for viewing and transferring data between documents, is stored, in whole, or in part, in database 170, and is used by, or is accessed by, a process for viewing and transferring data between documents. In one embodiment, database 170 is accessible by one or more users. In one embodiment, database 170 is used, and/or accessible, by a computing system, such as computing systems 100 and/or 150.

In one embodiment, computing systems 100 and 150, and database 170, are communicably coupled through network 130. Network 130 can be any network or network system as defined herein, and/or known in the art at the time of filing, and/or as developed after the time of filing, capable of allowing communication between two or more computing systems, server systems, and/or databases.

In one embodiment, computing systems 100 and 150, database 170, and network 130 are part of a cloud computing environment.

Those of skill in the art will readily recognize that the components shown in FIG. 1, such as computing systems 100 and 150, database 170, and their respective components, are shown for illustrative purposes only and that architectures with more or fewer components can implement, and benefit from, one or more embodiments. Moreover, one or more components of user computing system 100, website provider computing system 150, and database 170, may be located remotely from their respective system and accessed via network 130. In addition, the particular type of, and configuration of, computing systems 100 and 150 are not relevant.

As discussed above, in one embodiment, at least part of a process for viewing and transferring data between documents, and/or data and instructions associated with at least part of a process for viewing and transferring data between documents is stored, in whole, or in part, in user memory 103 and/or cache user memory 103A, of user computing system 100, and/or provider memory system 153 and/or cache memory 153A of website provider computing system 150.

Figure 2:
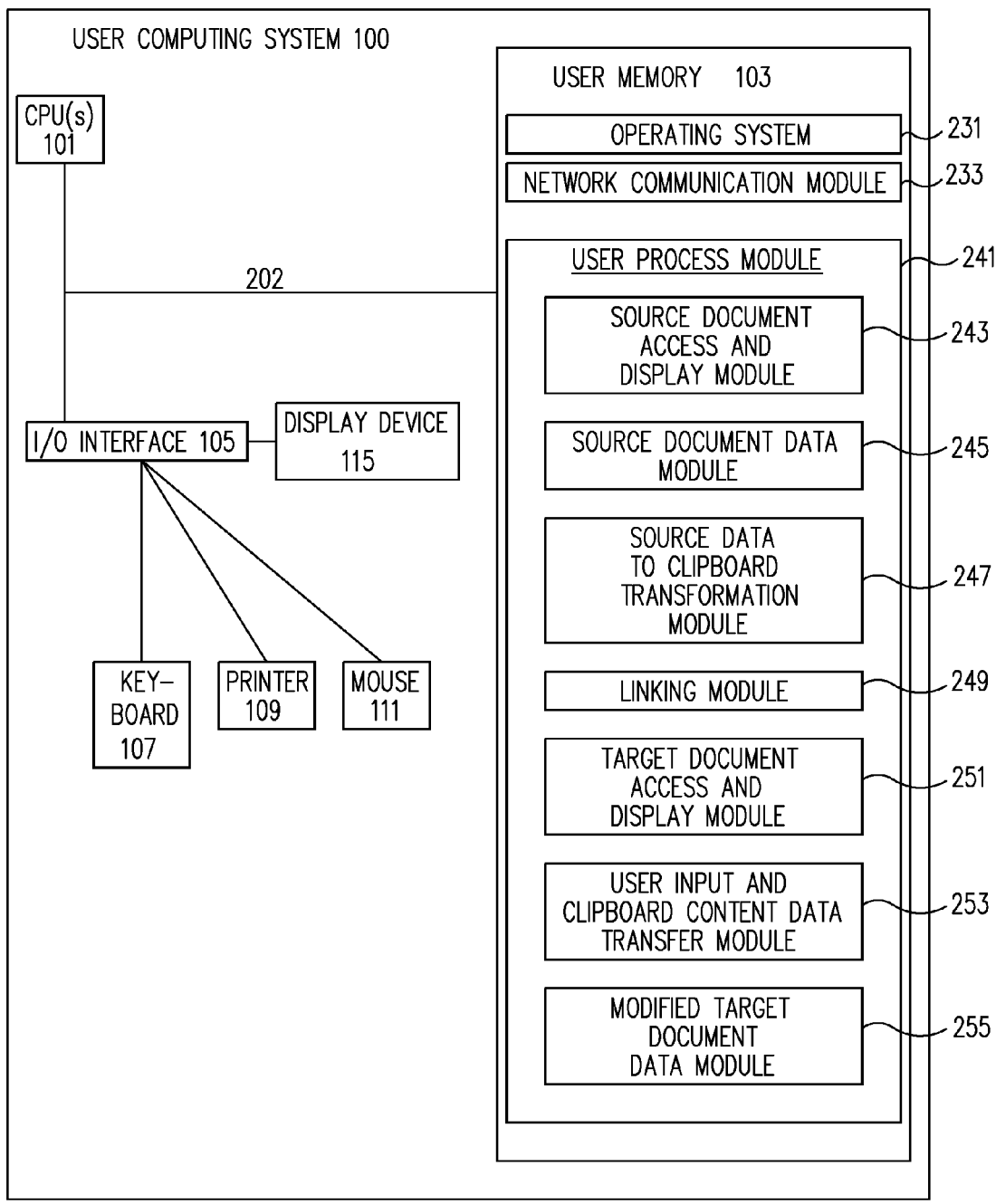
FIG. 2 is a block diagram showing more detail of an exemplary user computing system in accordance with one embodiment.

FIG. 2 is a more detailed block diagram of an exemplary user computing system 100 (FIG. 1). As seen in FIG. 2, in one embodiment, user computing system 100 includes one or more Central Processing Unit(s), CPU(s) 101; user memory 103; an Input/Output interface, I/O interface 105, including one or more user interface devices such as display device 115, keyboard 107, printer 109, and/or mouse 111; all interconnected by one or more communication buses 202.

Figure 3:
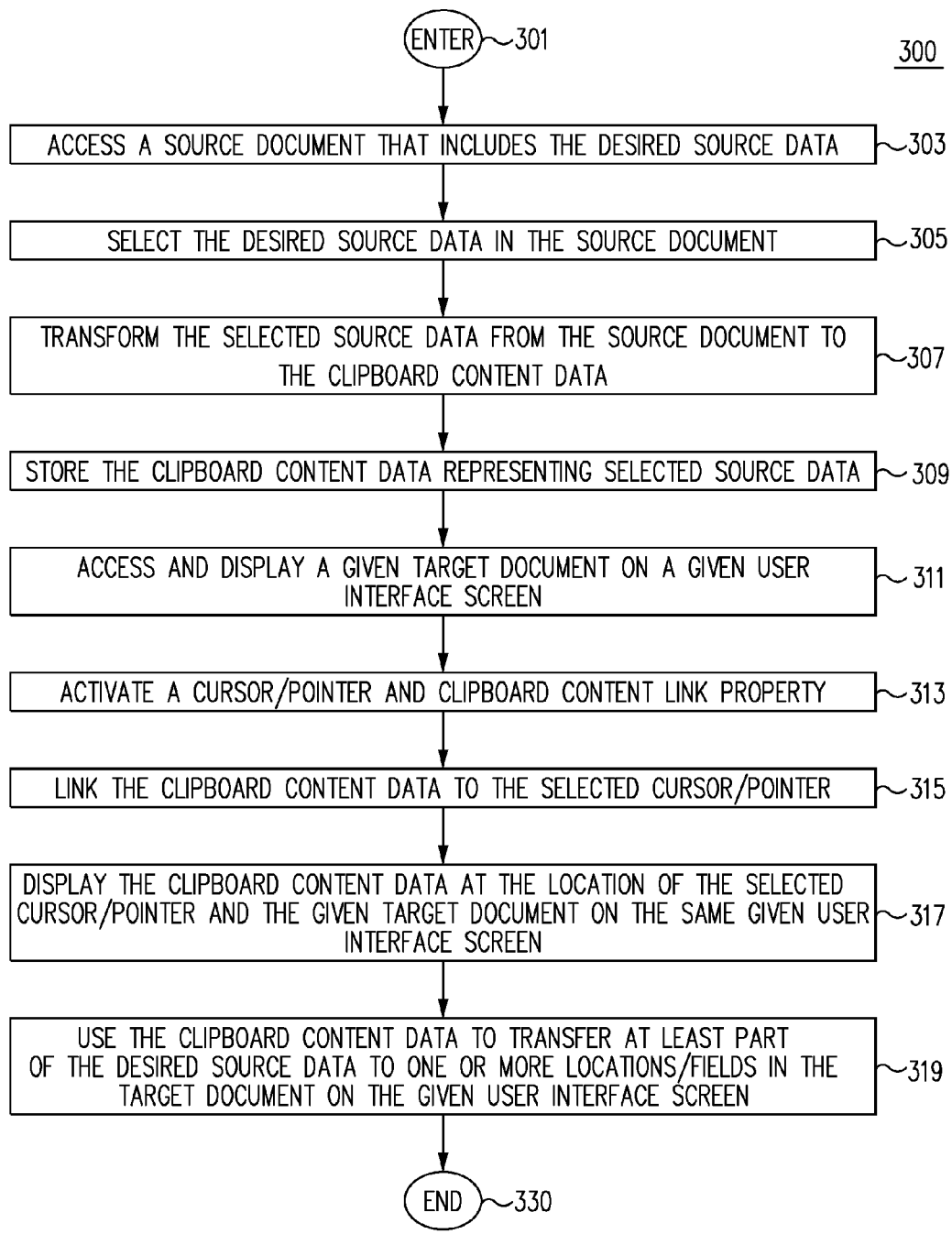
FIG. 3 is an exemplary flow chart illustrating one embodiment of a process for viewing and transferring data between documents.

As also seen in FIG. 2, in one embodiment, user memory 103 can store data and/or instructions associated with, but not limited to, the following elements, subsets of elements, and/or super sets of elements for processing by one or more processors, such as CPU(s) 101 (FIG. 2) and/or 151 (FIG. 3): operating system 231 that includes procedures, data, and/or instructions for handling various services and performing/coordinating hardware dependent tasks; network communications module 233 that includes procedures, data, and/or instructions, for connecting user computing system 100 to other computing systems, such as another user computing system 100 and/or website provider computing system 150 of FIG. 1, and/or a network, such as network 130 of FIG. 1, and/or a database, such as database 170 of FIG. 1; and user process module 241 (FIG. 2) that includes procedures, data, and/or instructions, for implementing at least part of a process for viewing and transferring data between documents 300 (FIG. 3).

As also seen in FIG. 2, in one embodiment, user process module 241 of user memory 103 includes: source document access and display module 243 that includes procedures, data, and/or instructions for accessing and displaying a given source document on a given user interface screen; source document data module 245 (FIG. 2) that includes procedures, data, and/or instructions for storing source data and selecting a portion of the source data; source data to clipboard content data transformation module 247 that includes procedures, data, and/or instructions, for converting the selected portion of source data into clipboard content data; linking module 249 that includes procedures, data, and/or instructions for linking the clipboard content data of source data to clipboard content data transformation module 247 to a selected cursor/pointer; target document access and display module 251 that includes procedures, data, and/or instructions for accessing and displaying a given target form or document in a given user interface screen; user input and clipboard content data transfer module 251 that includes procedures, data, and/or instructions for allowing a user to select a given individual data element of the clipboard content data of source data to clipboard content data transformation module 247 associated with a given one of the one or more data fields of the given target electronic form, or other target document, of target document access and display module 251 through the given user interface screen and to transfer the given individual data element into the associated one of the one more data fields of the given target electronic form, or other target document, without leaving the user interface display screen; and modified target document data module 255 that includes procedures, data, and/or instructions for storing the modified target electronic form, or other target document.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 and discussed herein do not limit the scope as claimed below.

A more detailed discussion of the operation of exemplary user computing system 100, user memory 103, and user process module 241 of user memory 103, is provided below with respect to FIG. 3.

Process

Herein, the terms "user", includes, but is not limited to any person, party, business, system, application, organization, and/or entity interacting with, interfacing with, contacting, viewing, providing data to, accepting data from, requesting data from, and/or otherwise associating with the process for viewing and transferring data between documents for any purpose.

As used herein, the term computing system implemented financial management system includes, but is not limited to: computing system implemented personal and/or business financial management systems, packages, programs, modules, or applications; computing system implemented personal and/or business tax preparation systems, packages, programs, modules, or applications; computing system implemented personal and/or business accounting and/or invoicing systems, packages, programs, modules, or applications; and various other personal and/or business electronic data management systems, packages, programs, modules, or applications, whether known at the time of filling or as developed later.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented accounting and/or invoicing systems, packages, programs, modules, or applications; computing system implemented financial management systems, packages, programs, modules, or applications; computing system implemented financial management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for viewing and transferring data between documents includes a process for viewing and transferring data between documents whereby source data a user desires to transfer from a source document to the one or more data fields and/or locations of a given target electronic form, or other target document, is transformed into clipboard content data. The clipboard content data is then linked to a selected cursor/pointer, or other user interface device, such that the clipboard content data can be displayed along with the target electronic form, or other target document, on the same given user interface screen, wherever the selected cursor/pointer is located on the user interface screen. This allows the user to quickly view and transfer the source data to the target electronic form, or other target document, within the same given user interface screen, and within a common display context, without having to toggle between the target electronic form, or other target document.

FIG. 3 a flow chart depicting a process for viewing and transferring data between documents 300 in accordance with one embodiment. Process for viewing and transferring data between documents 300 begins at ENTER OPERATION 301 of FIG. 3 and process flow proceeds to ACCESS A SOURCE DOCUMENT THAT INCLUDES THE DESIRED SOURCE DATA OPERATION 303.

In one embodiment, at ACCESS A SOURCE DOCUMENT THAT INCLUDES THE DESIRED SOURCE DATA OPERATION 303 a user accesses a source document that includes source data the user desires to transfer to the one or more data fields of a given target electronic form, or other target document.

In one embodiment, at ACCESS A SOURCE DOCUMENT THAT INCLUDES THE DESIRED SOURCE DATA OPERATION 303 the user accesses a source document that includes source data the user desires to transfer to the one or more data fields of the given target electronic form, or other target document, via a computing system, such as user computing system 100 of FIGS. 1 and 2 and/or website provider computing system 150 of FIG. 1, that is any computing system and/or server system, such as, but not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices.

In one embodiment, at ACCESS A SOURCE DOCUMENT THAT INCLUDES THE DESIRED SOURCE DATA OPERATION 303 the user accesses a source document that includes source data the user desires to transfer to the one or more data fields of the given target electronic form, or other target document, using a source document access and display module, such as source document access and display module 243 of user process module 241 of user memory 103 of computing system 100 of FIGS. 1 and 2.

Returning to FIG. 3, in one embodiment, at ACCESS A SOURCE DOCUMENT THAT INCLUDES THE DESIRED SOURCE DATA OPERATION 303 the user accesses the source document that includes source data the user desires to transfer to the one or more data fields of the given target electronic form, or other target document, via a computer readable medium, and/or any other computer program product. In one embodiment, at ACCESS A SOURCE DOCUMENT THAT INCLUDES THE DESIRED SOURCE DATA OPERATION 303 the given target electronic form, or other target document, is accessed and displayed on a user computing system via any network or network system such as, but not limited to, network 130 of FIG. 1, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems. In one example, a user accesses the source document via any webpage and/or a web-based system, or any site on a public network such as the Internet.

Returning to FIG. 3, in one embodiment, the source document of ACCESS A SOURCE DOCUMENT THAT INCLUDES THE DESIRED SOURCE DATA OPERATION 303 is any document in any one of numerous formats such as, but not limited to: a Microsoft word document; a Microsoft Excel spreadsheet; Invoice documents; a notepad; a resume document; an e-mail signature; payroll documents; employee listings; or any other document containing the desired source data.

In one embodiment, the source document of ACCESS A SOURCE DOCUMENT THAT INCLUDES THE DESIRED SOURCE DATA OPERATION 303 is any document created by, or in association with, a computing system implemented data management system, such as, but not limited to: computing system implemented accounting and/or invoicing systems, packages, programs, modules, or applications; computing system implemented financial management systems, packages, programs, modules, or applications; computing system implemented financial management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications.

FIG. 4 is an illustrative example of a source document 400, including source data 419 that, in this specific example, is accessed at ACCESS A SOURCE DOCUMENT THAT INCLUDES THE DESIRED SOURCE DATA OPERATION 303 (FIG. 3).

As seen in FIG. 4, source document 400 includes data regarding individual patent application entries grouped into the following data categories or data columns: docket number 403; inventor 405; inventor Date Of Birth (DOB) 407; inventor citizenship 409; draft due date 411; filing due date 413; and application status 415.

Also shown in FIG. 4 is pull down menu 417 with the function "copy" selected for the selected entry source data 419.

Those of skill in the art will readily recognize that the type, subject matter, layout, and relationships of data in source document 400 of FIG. 4 were chosen for strictly illustrative purposes and that other examples of source documents 400 could contain entirely different types, subject matter, layouts and relationships to those of source document 400. Consequently, the type, subject matter, layout, and relationships shown in source document 400 in no way limits the invention as claimed below.

Returning to FIG. 3, once the user accesses a source document that includes source data the user desires to transfer to the one or more data fields of the given target electronic form, or other target document, at ACCESS A SOURCE DOCUMENT THAT INCLUDES THE DESIRED SOURCE DATA OPERATION 303, process flow proceeds to SELECT THE DESIRED SOURCE DATA IN THE SOURCE DOCUMENT OPERATION 305.

In one embodiment, at SELECT THE DESIRED SOURCE DATA IN THE SOURCE DOCUMENT OPERATION 305 the user selects a portion of the source data in the source document of ACCESS A SOURCE DOCUMENT THAT INCLUDES THE DESIRED SOURCE DATA OPERATION 303 that the user desires to transfer to the one or more data fields of the given target electronic form, or other target document.

In one embodiment, at SELECT THE DESIRED SOURCE DATA IN THE SOURCE DOCUMENT OPERATION 305 the user selects a portion of the source data in the source document that the user desires to transfer to the one or more data fields of the given target electronic form, or other target document, and the entire desired portion of source data is then copied from the source document in the single user selection action. In one embodiment the user selection action is performed via any user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

As noted above, FIG. 4 shows the function "copy" selected for the selected entry source data 419 that is associated with application docket number 12343 and includes individual data elements: inventor last name: McKay; inventor DOB: Apr. 23, 1982; inventor citizenship: UK; draft due date: Oct. 3, 2009; filing due date: Dec. 3, 2009; and application status: filed Nov. 3, 2009.

Returning to FIG. 3, in one embodiment, once the user selects a portion of the source data in the source document of ACCESS A SOURCE DOCUMENT THAT INCLUDES THE DESIRED SOURCE DATA OPERATION 303 that the user desires to transfer to the one or more data fields of the given target electronic form, or other target document, at SELECT THE DESIRED SOURCE DATA IN THE SOURCE DOCUMENT OPERATION 305, process flow proceeds to TRANSFORM THE SELECTED SOURCE DATA FROM THE SOURCE DOCUMENT TO CLIPBOARD CONTENT DATA OPERATION 307.

In one embodiment, at TRANSFORM THE SELECTED SOURCE DATA FROM THE SOURCE DOCUMENT TO CLIPBOARD CONTENT DATA OPERATION 307 the selected portion of the source data of SELECT THE DESIRED SOURCE DATA IN THE SOURCE DOCUMENT OPERATION 305 in the source document of ACCESS A SOURCE DOCUMENT THAT INCLUDES THE DESIRED SOURCE DATA OPERATION 303 is transformed into clipboard content data.

As discussed above, A clipboard is a block of system memory that can be used to store data temporarily. Multiple memory objects can be stored in the clipboard. Memory objects on the clipboard can be in any data format, called a clipboard format. Each format is identified by an unsigned integer value. Once the data has been copied to the clipboard it can be pasted into another location.

Methods, mechanisms, means, procedures and processes for clipboarding, and/or creating clipboards, and/or transforming data into clipboard content data are well known in the art. Consequently, a more detailed discussion of specific methods, mechanisms, means, procedures and processes for clipboarding, and/or creating clipboards, and/or transforming data into clipboard content data is omitted here to avoid detracting from the invention.

In one embodiment, once the selected portion of the source data of SELECT THE DESIRED SOURCE DATA IN THE SOURCE DOCUMENT OPERATION 305 in the source document of ACCESS A SOURCE DOCUMENT THAT INCLUDES THE DESIRED SOURCE DATA OPERATION 303 is transformed into clipboard content data using one of more processors associated with a computing system at TRANSFORM THE SELECTED SOURCE DATA FROM THE SOURCE DOCUMENT TO CLIPBOARD CONTENT DATA OPERATION 307, process flow proceeds to STORE THE CLIPBOARD CONTENT DATA REPRESENTING SELECTED SOURCE DATA OPERATION 309.

In one embodiment, at STORE THE CLIPBOARD CONTENT DATA REPRESENTING SELECTED SOURCE DATA OPERATION 309 the clipboard content data is stored in whole, or in part, in a data storage means maintained by, accessible by, owned by, or otherwise related to: process for viewing and transferring data between documents 300 (FIG. 3), and/or a provider of process for viewing and transferring data between documents 300; or any other party, by any one of the numerous mechanisms known to those of skill in the art.

For instance, in one embodiment, at STORE THE CLIPBOARD CONTENT DATA REPRESENTING SELECTED SOURCE DATA OPERATION 309 the clipboard content data is stored in whole, or in part, in a memory system, such as user memory system 103 of user computing system 100 (FIG. 1 and/or FIG. 2). As another example, in one embodiment, at STORE THE CLIPBOARD CONTENT DATA REPRESENTING SELECTED SOURCE DATA OPERATION 309 the clipboard content data is stored in whole, or in part, in a memory system, such as provider memory system 153 of website provider computing system 150 (FIG. 1 and/or FIG. 3.

Returning to FIG. 3, in other embodiments, at STORE THE CLIPBOARD CONTENT DATA REPRESENTING SELECTED SOURCE DATA OPERATION 309 the clipboard content data is stored in whole, or in part, in any computing system memory, or server memory system memory, or database, such as database 170, of FIG. 1, or in a cache memory, such as cache memory 153A of FIG. 1 and FIG. 3, or in any main memory or mass memory, associated with a computing system, such as computing systems 100 or 150 described above. In one embodiment, at STORE THE CLIPBOARD CONTENT DATA REPRESENTING SELECTED SOURCE DATA OPERATION 309 the clipboard content data is stored in whole, or in part, in any computing system and/or server system, or other device, in another location, or on/in a computer readable medium, and/or any other computer program product. In one embodiment, the data, in whole, or in part, is stored on a webpage, in a web-based system, or on a public network such as the Internet.

In one embodiment, once the clipboard content data is stored in whole, or in part, in a data storage means maintained by, accessible by, owned by, or otherwise related to: process for viewing and transferring data between documents 300 (FIG. 3), and/or a provider of process for viewing and transferring data between documents 300; or any other party, by any one of the numerous mechanisms known to those of skill in the art at STORE THE CLIPBOARD CONTENT DATA REPRESENTING SELECTED SOURCE DATA OPERATION 309, process flow proceeds to ACCESS AND DIS-

PLAY A GIVEN TARGET DOCUMENT ON A GIVEN USER INTERFACE SCREEN OPERATION 311.

In one embodiment, at ACCESS AND DISPLAY A GIVEN TARGET DOCUMENT ON A GIVEN USER INTERFACE SCREEN OPERATION 311 a given target electronic form, or other target document, is accessed and displayed on a given user interface screen of a display device associated with a computing system.

In one embodiment, the given target electronic form, or other target document, is accessed and displayed at ACCESS AND DISPLAY A GIVEN TARGET DOCUMENT ON A GIVEN USER INTERFACE SCREEN OPERATION 311 on a user computing system, such user computing system 100 of FIGS. 1 and 2. In one embodiment, the given target electronic form, or other target document, is accessed and displayed at ACCESS AND DISPLAY A GIVEN TARGET DOCUMENT ON A GIVEN USER INTERFACE SCREEN OPERATION 311 on a user computing system using a target document access and display module, such as target document access and display module 251 of user process module 241 of user memory 103 of user computing system 100 of FIG. 2. Returning to FIG. 3, in one embodiment, the given target electronic form, or other target document, is accessed and displayed at ACCESS AND DISPLAY A GIVEN TARGET DOCUMENT ON A GIVEN USER INTERFACE SCREEN OPERATION 311 (FIG. 3) on a user computing system through a web-browser, such as internet browser 182 of FIG. 1.

In one embodiment, the given target electronic form, or other target document, is accessed and displayed on a user computing system at ACCESS AND DISPLAY A GIVEN TARGET DOCUMENT ON A GIVEN USER INTERFACE SCREEN OPERATION 311 (FIG. 3) by accessing a website provider computing system, such as website provider computing system 150 of FIG. 1. In one embodiment, the given target electronic form, or other target document, is accessed and displayed on a user computing system at ACCESS AND DISPLAY A GIVEN TARGET DOCUMENT ON A GIVEN USER INTERFACE SCREEN OPERATION 311 (FIG. 3) by accessing website a provider computing system that is a web-server and/or a web-based system.

In one embodiment, the given user interface screen of the display device is associated with a computing system, such as user computing system 100 and display device 115 of user computing system 100 of FIG. 2, that is any computing system and/or server system, such as, but not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices.

In one embodiment, the given target electronic form, or other target document, is accessed and displayed on a user computing system at ACCESS AND DISPLAY A GIVEN TARGET DOCUMENT ON A GIVEN USER INTERFACE SCREEN OPERATION 311 (FIG. 3) by accessing any other electronic device, and/or via a computer readable medium, and/or any other computer program product. In one embodiment, the given target electronic form, or other target document, is accessed and displayed on a user computing system at ACCESS AND DISPLAY A GIVEN TARGET DOCUMENT ON A GIVEN USER INTERFACE SCREEN OPERATION 311 (FIG. 3) via any network or network system such as, but not limited to, network 130 of FIG. 1, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems. In one example, a user accesses the source document via any webpage and/or a web-based system, or any site on a public network such as the Internet.

Figure 5:
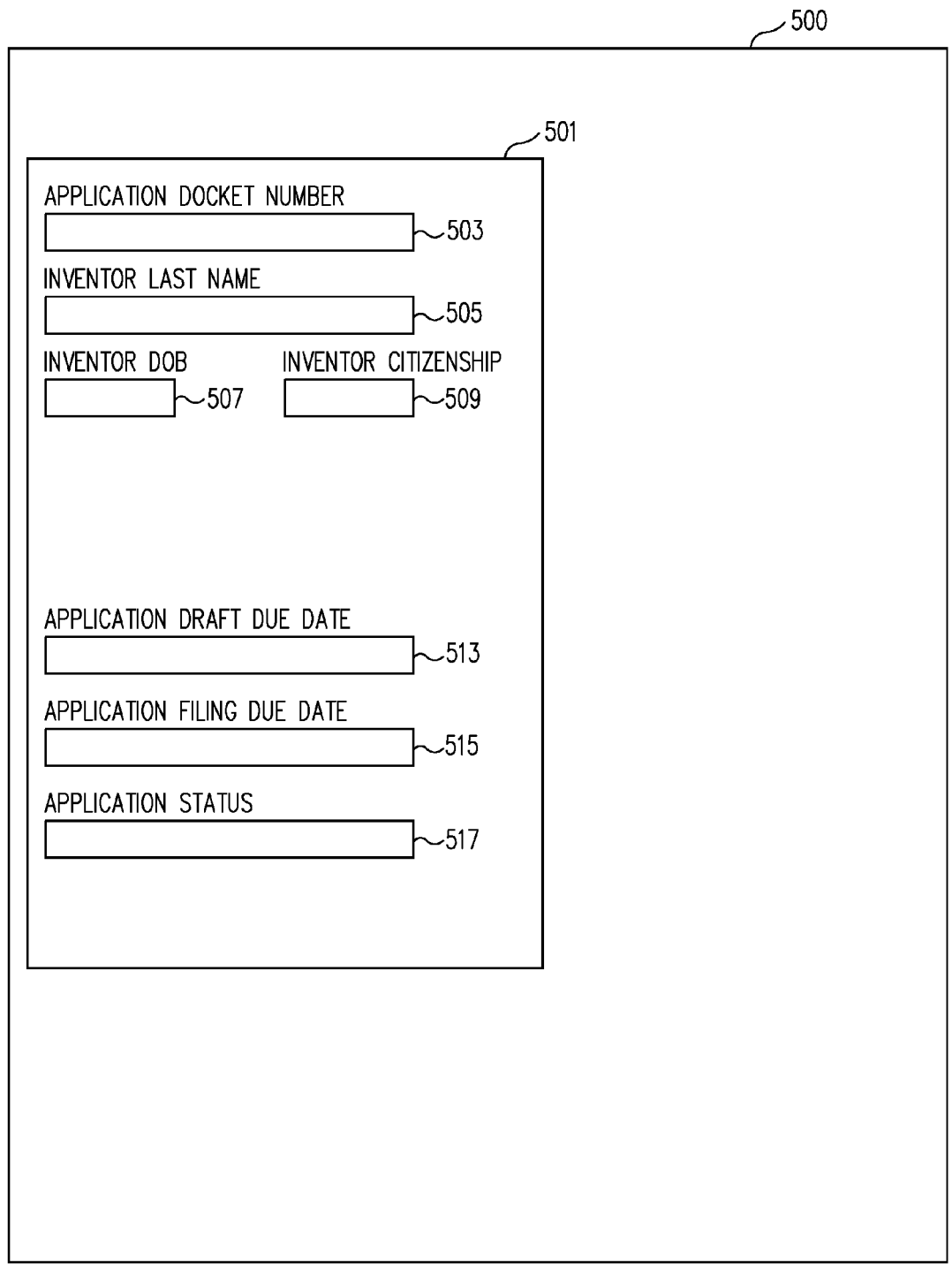
FIG. 5 is an illustrative example of a target form, or other target document, displayed a given user interface display of a display device associated with a user computing system in accordance with one embodiment.

FIG. 5 shows an illustrative example of a target electronic form, or other target document, 501 displayed at ACCESS AND DISPLAY A GIVEN TARGET DOCUMENT ON A GIVEN USER INTERFACE SCREEN OPERATION 311 on a given user interface screen 500 of a display device associated with a user computing system in accordance with one embodiment.

As seen in FIG. 5, in one embodiment, target electronic form, or other target document, 501 is a patent application docketing electronic form and includes: application docket number field 503; inventor last name data field 505; inventor Date Of Birth (DOB) data field 507; inventor citizenship data field 509; application draft due date data field 513; application filing due date data field 515; and application status data field 517.

Those of skill in the art will readily recognize that the type, subject matter, layout, and relationships of electronic form, or other target document, 501 were chosen for strictly illustrative purposes and that other examples of electronic form, or other target document, 501 could contain entirely different types, subject matter, layouts and relationships to those of electronic form, or other target document, 501. Consequently, the specific type, subject matter, layout, and relationships shown in electronic form, or other target document, 501 in no way limits the invention as claimed below.

Returning to FIG. 3, in one embodiment, once a given target electronic form, or other target document, is accessed and displayed on a given user interface screen of a display device associated with a computing system at ACCESS AND DISPLAY A GIVEN TARGET DOCUMENT ON A GIVEN USER INTERFACE SCREEN OPERATION 311, process flow proceeds to ACTIVATE A CURSOR/POINTER AND CLIPBOARD CONTENT LINK PROPERTY OPERATION 313.

In one embodiment, at ACTIVATE A CURSOR/POINTER AND CLIPBOARD CONTENT LINK PROPERTY OPERATION 313 the user activates a cursor/pointer and clipboard content linking property through the given user interface screen of ACCESS AND DISPLAY A GIVEN TARGET DOCUMENT ON A GIVEN USER INTERFACE SCREEN OPERATION 311.

In one embodiment, the cursor/pointer and clipboard content linking property is an operating system cursor/pointer property/feature accessed and activated at ACTIVATE A CURSOR/POINTER AND CLIPBOARD CONTENT LINK PROPERTY OPERATION 313 via a pull-down menu or by any other access means.

In one embodiment, the cursor/pointer and clipboard content linking property is an operating system clipboard property/feature accessed and activated at ACTIVATE A CURSOR/POINTER AND CLIPBOARD CONTENT LINK PROPERTY OPERATION 313 via a pull-down menu or by any other access means.

In one embodiment, at ACTIVATE A CURSOR/POINTER AND CLIPBOARD CONTENT LINK PROPERTY OPERATION 313 the user activates the cursor/pointer and clipboard content linking property through the given user interface screen of ACCESS AND DISPLAY A GIVEN TARGET DOCUMENT ON A GIVEN USER INTERFACE SCREEN OPERATION 311 using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

In one embodiment, at ACTIVATE A CURSOR/POINTER AND CLIPBOARD CONTENT LINK PROPERTY OPERATION 313 the user activates the cursor/pointer and clipboard content linking property through the given user interface screen, such as user interface screen 500 of FIG. 5, by activating an icon or other symbol displayed on the given user interface screen.

In one embodiment, at ACTIVATE A CURSOR/POINTER AND CLIPBOARD CONTENT LINK PROPERTY OPERATION 313 the user activates the cursor/pointer and clipboard content linking property through the given user interface screen of ACCESS AND DISPLAY A GIVEN TARGET DOCUMENT ON A GIVEN USER INTERFACE SCREEN OPERATION 311 through the given user interface screen by activating an icon or other symbol displayed on the given user interface screen as part of a web-browser application (not shown).

Retuning the FIG. 3, in one embodiment, once the user activates the cursor/pointer and clipboard content linking property through the given user interface screen of ACCESS AND DISPLAY A GIVEN TARGET DOCUMENT ON A GIVEN USER INTERFACE SCREEN OPERATION 311 at ACTIVATE A CURSOR/POINTER AND CLIPBOARD CONTENT LINK PROPERTY OPERATION 313, process flow proceeds to LINK THE CLIPBOARD CONTENT DATA TO THE SELECTED CURSOR/POINTER OPERATION 315.

In one embodiment, at LINK THE CLIPBOARD CONTENT DATA TO THE SELECTED CURSOR/POINTER OPERATION 315 the clipboard content data of TRANSFORM THE SELECTED SOURCE DATA FROM THE SOURCE DOCUMENT TO CLIPBOARD CONTENT DATA OPERATION 307 and STORE THE CLIPBOARD CONTENT DATA REPRESENTING SELECTED SOURCE DATA OPERATION 309 is linked to a selected cursor/pointer and/or any other positionable user interface device.

In one embodiment, at LINK THE CLIPBOARD CONTENT DATA TO THE SELECTED CURSOR/POINTER OPERATION 315 the clipboard content data of TRANSFORM THE SELECTED SOURCE DATA FROM THE SOURCE DOCUMENT TO CLIPBOARD CONTENT DATA OPERATION 307 and STORE THE CLIPBOARD CONTENT DATA REPRESENTING SELECTED SOURCE DATA OPERATION 309 is linked to a selected cursor/pointer and/or any other positionable user interface device such that the clipboard content data can be displayed along with the given target electronic form, or other target document, of ACCESS AND DISPLAY A GIVEN TARGET DOCUMENT ON A GIVEN USER INTERFACE SCREEN OPERATION 311 on the same given user interface screen, wherever the selected cursor/pointer is located on the given user interface screen.

In one embodiment, once the clipboard content data of TRANSFORM THE SELECTED SOURCE DATA FROM THE SOURCE DOCUMENT TO CLIPBOARD CONTENT DATA OPERATION 307 and STORE THE CLIPBOARD CONTENT DATA REPRESENTING SELECTED SOURCE DATA OPERATION 309 is linked to a selected cursor/pointer and/or any other positionable user interface device such that the clipboard content data can be displayed along with the given target electronic form, or other target document, of ACCESS AND DISPLAY A GIVEN TARGET DOCUMENT ON A GIVEN USER INTERFACE SCREEN OPERATION 311 on the same given user interface screen, wherever the selected cursor/pointer is located on the given user interface screen at LINK THE CLIPBOARD CONTENT DATA TO THE SELECTED CURSOR/POINTER OPERATION 315, process flow proceeds to DISPLAY THE CLIPBOARD CONTENT DATA AT THE LOCATION OF THE SELECTED CURSOR/POINTER AND THE GIVEN TARGET DOCUMENT ON THE SAME GIVEN USER INTERFACE SCREEN OPERATION 317.

In one embodiment, at DISPLAY THE CLIPBOARD CONTENT DATA AT THE LOCATION OF THE SELECTED CURSOR/POINTER AND THE GIVEN TARGET DOCUMENT ON THE SAME GIVEN USER INTERFACE SCREEN OPERATION 317 the linked selected cursor/pointer, and/or any other positionable user interface device, and clipboard content data of LINK THE CLIPBOARD CONTENT DATA TO THE SELECTED CURSOR/POINTER OPERATION 315 is displayed on the given user interface display of ACCESS AND DISPLAY A GIVEN TARGET DOCUMENT ON A GIVEN USER INTERFACE SCREEN OPERATION 311 simultaneously with the given target electronic form, or other target document, of ACCESS AND DISPLAY A GIVEN TARGET DOCUMENT ON A GIVEN USER INTERFACE SCREEN OPERATION 311.

Figure 6:
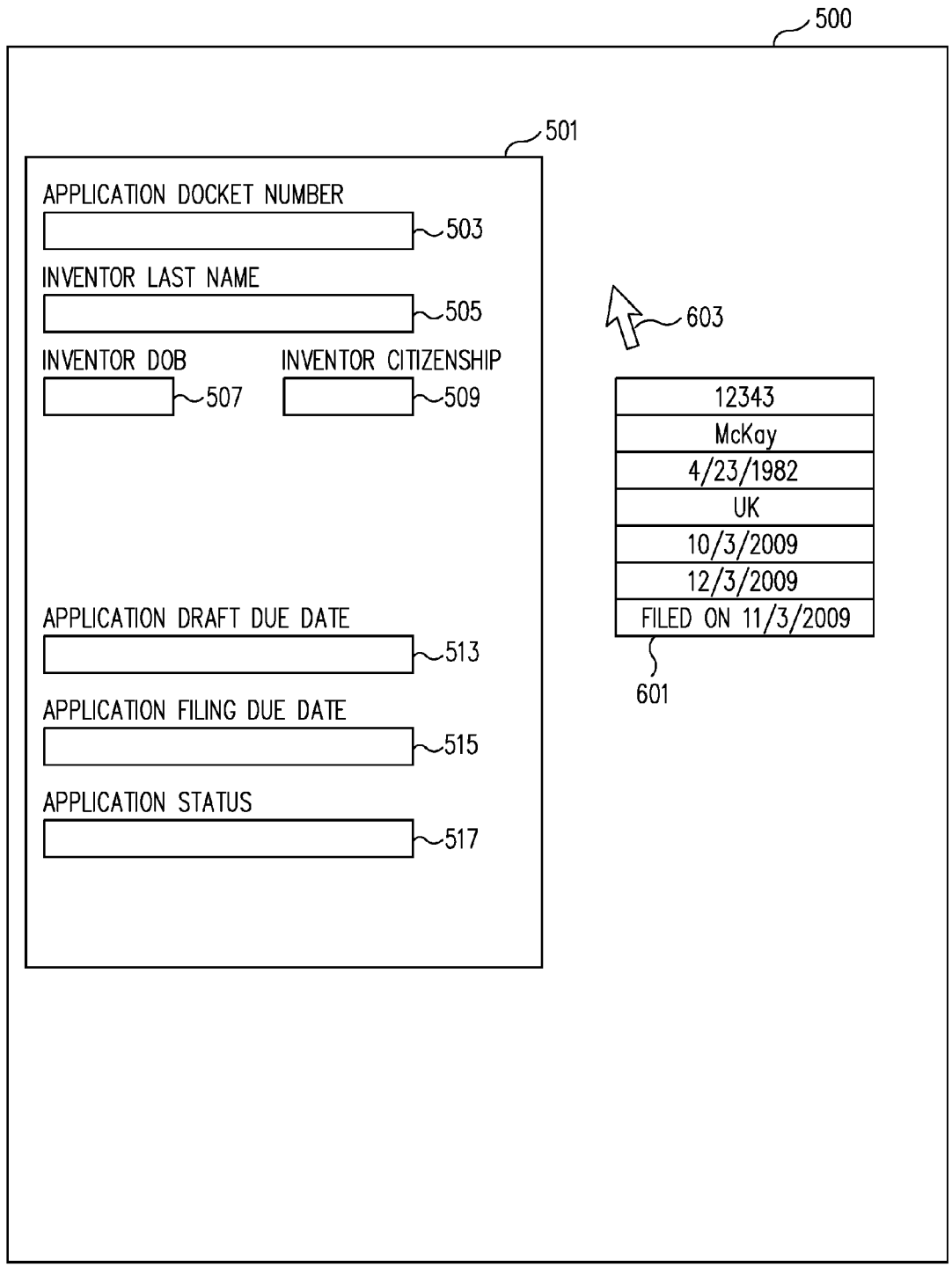
FIG. 6 is the given user interface display of FIG. 5 including a target form or other target document, and further including clipboard content data linked to a pointer in accordance with one embodiment.

FIG. 6 shows the given user interface display 500 of FIG. 5 including target electronic form, or other target document, 501 and further including clipboard content data 601 linked to a pointer 603 in accordance with one embodiment.

As seen in FIG. 6, in this specific example, clipboard content data 601 includes the selected source document data of FIG. 4 and selected entry source data 419 that is associated with application docket number 12343 and includes individual data elements: inventor last name: McKay; inventor DOB: Apr. 23, 1982; inventor citizenship: UK; draft due date: Oct. 3, 2009; filing due date: Dec. 3, 2009; and application status: filed Nov. 3, 2009.

As noted above, in one embodiment, clipboard content data 601 is linked to a pointer 603 such that clipboard content data 601 can be displayed along with target electronic form, or other target document, 501 on the same given user interface screen 500, wherever pointer 603 is located on given user interface screen 500.

In one embodiment, once the linked selected cursor/pointer, and/or any other positionable user interface device, and clipboard content data of LINK THE CLIPBOARD CONTENT DATA TO THE SELECTED CURSOR/POINTER OPERATION 315 is displayed on the given user interface display of ACCESS AND DISPLAY A GIVEN TARGET DOCUMENT ON A GIVEN USER INTERFACE SCREEN OPERATION 311 simultaneously with the given target electronic form, or other target document, of ACCESS AND DISPLAY A GIVEN TARGET DOCUMENT ON A GIVEN USER INTERFACE SCREEN OPERATION 311 at DISPLAY THE CLIPBOARD CONTENT DATA AT THE LOCATION OF THE SELECTED CURSOR/POINTER AND THE GIVEN TARGET DOCUMENT ON THE SAME GIVEN USER INTERFACE SCREEN OPERATION 317 process flow proceeds to USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319.

In one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user uses the clipboard content data of TRANSFORM THE SELECTED SOURCE DATA FROM THE SOURCE DOCUMENT TO CLIPBOARD CONTENT DATA OPERATION 307 is used to transfer at least part of the desired source data of SELECT THE DESIRED SOURCE DATA IN THE SOURCE DOCUMENT OPERATION 305 from the source document of ACCESS A SOURCE DOCUMENT THAT INCLUDES THE DESIRED SOURCE DATA OPERATION 303 to selected portions, locations, or fields of the target document of ACCESS AND DISPLAY A GIVEN TARGET DOCUMENT ON A GIVEN USER INTERFACE SCREEN OPERATION 311 on the given user interface screen of ACCESS AND DISPLAY A GIVEN TARGET DOCUMENT ON A GIVEN USER INTERFACE SCREEN OPERATION 311 that displays both the clipboard content data of TRANSFORM THE SELECTED SOURCE DATA FROM THE SOURCE DOCUMENT TO CLIPBOARD CONTENT DATA OPERATION 307 and the target document of ACCESS AND DISPLAY A GIVEN TARGET DOCUMENT ON A GIVEN USER INTERFACE SCREEN OPERATION 311.

In one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user uses the fact that the clipboard content data displays at least part of the desired source data on the same given user interface screen as the target document to manually copy and enter at least part of the desired source data from the clipboard content data without having to toggle between two of more documents and/or two of more screens.

In one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user selected portion of the source data of SELECT THE DESIRED SOURCE DATA IN THE SOURCE DOCUMENT OPERATION 305 in the source document of ACCESS A SOURCE DOCUMENT THAT INCLUDES THE DESIRED SOURCE DATA OPERATION 303 is parsed into individual data elements at SELECT THE DESIRED SOURCE DATA IN THE SOURCE DOCUMENT OPERATION 305 so that, in one embodiment the clipboard content data of TRANSFORM THE SELECTED SOURCE DATA FROM THE SOURCE DOCUMENT TO CLIPBOARD CONTENT DATA OPERATION 307 is dynamic and that user can efficiently use individual data elements of the clipboard content data one by one.

In one embodiment, the selected source data is parsed into individual data elements, and/or gathered into individual data elements that consist of groupings of related data, using a processor and/or instructions provided by the user and/or the provider of the process for viewing and transferring data between documents.

In one embodiment, the user parsed selected portion of the source data in the source document is transformed into clipboard content data that is also parsed into the individual data elements at TRANSFORM THE SELECTED SOURCE DATA FROM THE SOURCE DOCUMENT TO CLIPBOARD CONTENT DATA OPERATION 307.

In one embodiment, the clipboard content data is parsed into individual data elements, and/or gathered into individual data elements that consist of groupings of related data, using a processor and/or instructions provided by the user and/or the provider of the process for viewing and transferring data between documents at TRANSFORM THE SELECTED SOURCE DATA FROM THE SOURCE DOCUMENT TO CLIPBOARD CONTENT DATA OPERATION 307.

In one embodiment, the user then accesses the given target electronic form, or other target document, at ACCESS AND DISPLAY A GIVEN TARGET DOCUMENT ON A GIVEN USER INTERFACE SCREEN OPERATION 311 via any of the means, mechanism, processes or procedures discussed above, and/or as known in the art at the time of filing, and/or as developed after the time of filing.

In one embodiment, the user activates the cursor/pointer and clipboard content linking property through the given user interface screen at ACTIVATE A CURSOR/POINTER AND CLIPBOARD CONTENT LINK PROPERTY OPERATION 313 via any of the means, mechanism, processes or procedures discussed above, and/or as known in the art at the time of filing, and/or as developed after the time of filing.

In one embodiment, the parsed clipboard content data is then linked to the selected cursor/pointer such that the parsed clipboard content data can be displayed along with the given target electronic form, or other target document, on the same given user interface screen, wherever the selected cursor/pointer is located on the given user interface screen at LINK THE CLIPBOARD CONTENT DATA TO THE SELECTED CURSOR/POINTER OPERATION 315 via any of the means, mechanism, processes or procedures discussed above, and/or as known in the art at the time of filing, and/or as developed after the time of filing.

In one embodiment, the individual data elements of the parsed clipboard content data are then displayed on the same given user interface screen as the given target electronic form, or other target document at DISPLAY THE CLIPBOARD CONTENT DATA AT THE LOCATION OF THE SELECTED CURSOR/POINTER AND THE GIVEN TARGET DOCUMENT ON THE SAME GIVEN USER INTERFACE SCREEN OPERATION 317.

In one embodiment, the individual data elements of the parsed clipboard content data are displayed at DISPLAY THE CLIPBOARD CONTENT DATA AT THE LOCATION OF THE SELECTED CURSOR/POINTER AND THE GIVEN TARGET DOCUMENT ON THE SAME GIVEN USER INTERFACE SCREEN OPERATION 317 in a clickable/draggable source data sub-display taking the form of a data clipboard.

In one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user then selects a given individual data element of the parsed clipboard content data associated with a given one of the one or more data fields and/or locations of the given target electronic form, or other target document, through the given user interface display and drags and drops the selected given individual data element of the parsed clipboard content data associated with a given one of the one or more data fields and/or locations of the given target electronic form, or other target document, into the given one of the one or more data fields and/or locations of the given target electronic form, or other target document, in one embodiment, without leaving the user interface display screen.

In one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 this process is then repeated for each individual data element of the parsed clipboard content data; thereby transforming the given target electronic form, or other target document, into an at least partially filled-in electronic form, or other document.

In one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user selects a given individual data element of the parsed clipboard content data associated with a given one of the one or more data fields of the given target electronic form, or other target document, through the given user interface display using a user interface device such as, but not limited to: a keyboard, a mouse, a touchpad, voice recognition software, or any other device and/or system capable of providing user input to a computing system and/or for translating user actions into computing system operations, whether available or known at the time of filing or as developed later.

In one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user pastes the given individual data element of the parsed clipboard content data associated with a given one of the one or more data fields of the given target electronic form, or other target document, into the associated given one of the one or more data fields of the given target electronic form, or other target document, through the given user interface display using a user interface device such as, but not limited to: a keyboard, a mouse, a touchpad, voice recognition software, or any other device and/or system capable of providing user input to a computing system and/or for translating user actions into computing system operations, whether available or known at the time of filing or as developed later.

As a specific example, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user positions the cursor/pointer on a given one of the one or more data fields of the given target electronic form, or other target document, such as "first name" and performs paste operation (Ctrl+V). In one embodiment, the clipboard content data representing the first name is then filled in the given target electronic form, or other target document, and the clipboard content data representing the first name is removed from clipboard.

Continuing with this specific example, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user positions the cursor/pointer on a given one of the one or more data fields of the given target electronic form, or other target document, such as "last name" and performs paste operation (Ctrl+V). In one embodiment, the clipboard content data representing the last name is then filled in the given target electronic form, or other target document, and the clipboard content data representing the last name is removed from clipboard.

Continuing with this specific example, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user positions the cursor/pointer on a given one of the one or more data fields of the given target electronic form, or other target document, such as "company name" and performs paste operation (Ctrl+V). In one embodiment, the clipboard content data representing the company name is then filled in the given target electronic form, or other target document, and the clipboard content data representing the company name is removed from clipboard.

Continuing with this specific example, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user positions the cursor/pointer on a given one of the one or more data fields of the given target electronic form, or other target document, such as "age" and performs paste operation (Ctrl+V). In one embodiment, the clipboard content data representing the age is then filled in the given target electronic form, or other target document, and the clipboard content data representing the age is removed from clipboard.

Continuing with this specific example, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user positions the cursor/pointer on a given one of the one or more data fields of the given target electronic form, or other target document, such as "city" and performs paste operation (Ctrl+V). In one embodiment, the clipboard content data representing the city is then filled in the given target electronic form, or other target document, and the clipboard content data representing the city is removed from clipboard.

Continuing with this specific example, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user positions the cursor/pointer on a given one of the one or more data fields of the given target electronic form, or other target document, such as "zip" and performs paste operation (Ctrl+V). In one embodiment, the clipboard content data representing the zip is then filled in the given target electronic form, or other target document, and the clipboard content data representing the zip is removed from clipboard.

Continuing with this specific example, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user positions the cursor/pointer on a given one of the one or more data fields of the given target electronic form, or other target document, such as "state" and performs paste operation (Ctrl+V). In one embodiment, the clipboard content data representing the state is then filled in the given target electronic form, or other target document, and the clipboard content data representing the state is removed from clipboard.

Continuing with this specific example, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the user positions the cursor/pointer on a given one of the one or more data fields of the given target electronic form, or other target document, such as "country" and performs paste operation (Ctrl+V). In one embodiment, the clipboard content data representing the country is then filled in the given target electronic form, or other target document, and the clipboard content data representing the country is removed from clipboard.

In one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the data transfer process described above is repeated for each individual data element of the parsed clipboard content that is associated with one or more data fields of the given target electronic form, or other target document.

In addition, in one embodiment, at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 the process described above can be repeated for multiple target electronic forms, or other target documents. Consequently, the user can fill in specific fields of multiple target electronic forms or other target documents without having to toggle between multiple source documents and/or multiple target electronic forms, or other target documents, and without having to individually cut and paste each source document field data and paste it into the each relevant target electronic form, or other target document, field manually.

Figure 7:
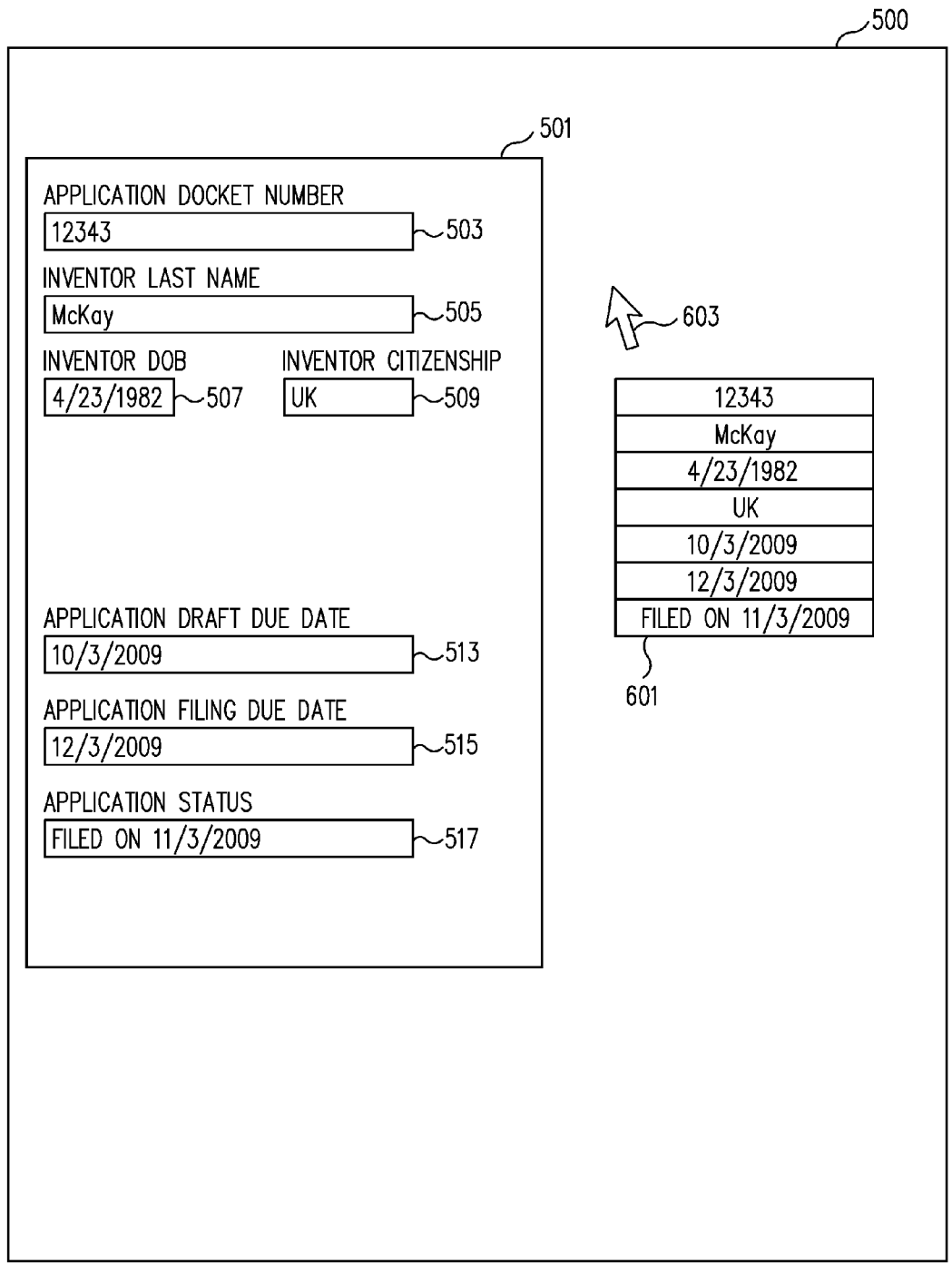
FIG. 7 is the given user interface display of FIG. 6 including a target form, or other target document, and clipboard content data linked to a pointer, after a user has transferred multiple individual data elements of the clipboard content data to the desired positions of the target form, or other target document, in accordance with one embodiment.

FIG. 7 shows the given user interface display 500 of FIG. 5 and FIG. 6 including target electronic form, or other target document, 501 and further including clipboard content data 601 linked to a pointer 603 in accordance with one embodiment.

As noted above with respect to FIG. 5, and as seen in FIG. 7, in one embodiment, target electronic form, or other target document, 501 is a patent application docketing electronic form and includes: application docket number field 503; inventor last name data field 505; inventor Date Of Birth (DOB) data field 507; inventor citizenship data field 509; application draft due date data field 513; application filing due date data field 515; and application status data field 517.

As also noted above, and as seen in FIG. 7, in this specific example, clipboard content data 601 includes the selected source document data of FIG. 4 and selected entry source data 419 that is associated with application docket number 12343 and includes individual data elements: inventor last name: McKay; inventor DOB: Apr. 23, 1982; inventor citizenship: UK; draft due date: Oct. 3, 2009; filing due date: Dec. 3, 2009; and application status: filed Nov. 3, 2009.

As also noted above, and as seen in FIG. 7, in one embodiment, clipboard content data 601 is linked to a pointer 603 such that clipboard content data 601 can be displayed along with target electronic form, or other target document, 501 on the same given user interface screen 500, wherever pointer 603 is located on given user interface screen 500.

As also seen in FIG. 7, in this specific example, clipboard content data 601 has been used to populate, i.e., transfer, the selected source document 400 data of FIG. 4 and selected entry source data 419 that is associated with application docket number 12343 including: inventor last name: McKay; inventor DOB: Apr. 23, 1982; inventor citizenship: UK; draft due date: Oct. 3, 2009; filing due date: Dec. 3, 2009; and application status: filed Nov. 3, 2009 to the corresponding target electronic form, or other target document, 501 fields: application docket number field 503; inventor last name data field 505; inventor Date Of Birth (DOB) data field 507; inventor citizenship data field 509; application draft due date data field 513; application filing due date data field 515; and application status data field 517.

In one embodiment, once the user uses the clipboard content data of TRANSFORM THE SELECTED SOURCE DATA FROM THE SOURCE DOCUMENT TO CLIPBOARD CONTENT DATA OPERATION 307 is used to transfer at least part of the desired source data of SELECT THE DESIRED SOURCE DATA IN THE SOURCE DOCUMENT OPERATION 305 from the source document of ACCESS A SOURCE DOCUMENT THAT INCLUDES THE DESIRED SOURCE DATA OPERATION 303 to selected portions, locations, or fields of the target document of ACCESS AND DISPLAY A GIVEN TARGET DOCUMENT ON A GIVEN USER INTERFACE SCREEN OPERATION 311 on the given user interface screen of ACCESS AND DISPLAY A GIVEN TARGET DOCUMENT ON A GIVEN USER INTERFACE SCREEN OPERATION 311 that displays both the clipboard content data of TRANSFORM THE SELECTED SOURCE DATA FROM THE SOURCE DOCUMENT TO CLIPBOARD CONTENT DATA OPERATION 307 and the target document of ACCESS AND DISPLAY A GIVEN TARGET DOCUMENT ON A GIVEN USER INTERFACE SCREEN OPERATION 311 at USE THE CLIPBOARD CONTENT DATA TO TRANSFER AT LEAST PART OF THE DESIRED SOURCE DATA TO ONE OR MORE LOCATIONS/FIELDS IN THE TARGET DOCUMENT ON THE GIVEN USER INTERFACE SCREEN OPERATION 319 process flow proceeds to EXIT OPERATION 330.

In one embodiment, at EXIT OPERATION 430, process for viewing and transferring data between documents 300 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for viewing and transferring data between documents 300, a user can copy all desired source data from one or more source documents in a single action. Then the desired source data from the one or more source documents is transformed into clipboard content data and the clipboard content data is linked to a selected cursor/pointer, or other user interface device, such that the clipboard content data can be displayed along with the target electronic form, or other target document, on the same given user interface screen, wherever the selected cursor/pointer is located on the user interface screen, to allow the user to quickly view and transfer the source data to the target electronic form, or other target document, within the same given user interface screen, and within a common display context, without having to toggle between the target electronic form, or other target document. Consequently, using embodiments of process for viewing and transferring data between documents 300, a user desiring to transfer source data from one or more source documents to data fields in an electronic form, or other target document, can reliably and efficiently transfer data between documents, while at the same time asserting considerable control over what data is transferred; and all from a single interface screen and within a common display context.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "accessing", "transforming", "analyzing", "activating", "storing", "saving", "displaying", "classifying", "providing", "processing", "parsing", "selecting", "linking", "displaying", 'using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:
1. A computing system implemented process for viewing and transferring data between documents comprising:
    accessing a source document, the source document including source data;
    a user selecting at least a portion of the source data in the source document using a user interface device associated with a user computing system;
    using a processor associated with the user computing system to copy the selected portion of the source data;

storing data representing the copy of the selected portion of the source data in a data storage means associated with the user computing system;

accessing a given target electronic form, or other target document, the given target electronic form, or other target document, having one or more locations for entering data into the given target electronic form, or other target document;

displaying the given target electronic form, or other target document, on a given user interface screen displayed on a display device associated with the user computing system;

using the processor associated with the user computing system to parse the data representing the copy of the selected portion of the source data into one or more individual data elements, thereby transforming the data representing the copy of the selected portion of the source data into parsed source data;

using the processor associated with the user computing system to transform at least part of the parsed source data into parsed clipboard content data including one or more individual data elements;

storing the parsed clipboard content data in the data storage means associated with the user computing system;

linking the parsed clipboard content data to a positionable pointing device;

displaying the linked parsed clipboard content data and positionable pointing device on the given user interface screen, such that the linked parsed clipboard content data and positionable pointing device and the given target electronic form, or other target document, are simultaneously displayed in the given user interface screen;

the user selecting a given one of the one or more individual data elements in the parsed clipboard content data the user desires to transfer to a given one of the one or more locations and for entering data into the given target electronic form, or other target document using the user interface device associated with the user computing system;

the user transferring the given one of the one or more individual data elements in the parsed clipboard content data to the given one of the one or more locations for entering data into the given target electronic form, or other target document using the user interface device associated with the user computing system.

2. The computing system implemented process for viewing and transferring data between documents of claim 1, wherein;
the given target electronic form, or other target document, is accessed through a web-browser that implements at least part of the computing system implemented process for viewing and transferring data between documents.

3. The computing system implemented process for viewing and transferring data between documents of claim 1, wherein;
the given target electronic form, or other target document, is accessed through a website that implements at least part of the computing system implemented process for viewing and transferring data between documents.

4. The computing system implemented process for viewing and transferring data between documents of claim 1, wherein;
the clipboard content data is linked to the positionable pointing device by activating a feature of the positionable pointing device.

5. The computing system implemented process for viewing and transferring data between documents of claim 1, wherein;
the clipboard content data is linked to the positionable pointing device by activating a feature of the clipboard content data.

6. The computing system implemented process for viewing and transferring data between documents of claim 1, wherein;
the data representing the copy of the selected portion of the source data is parsed into one or more individual data elements based on one or more groupings of the source data in the source document.

7. The computing system implemented process for viewing and transferring data between documents of claim 1, wherein;
the data representing the copy of the selected portion of the source data is parsed into one or more individual data elements based on the one or more locations for entering data into the given target electronic form, or other target document using the user interface device associated with the user computing system.

8. The computing system implemented process for viewing and transferring data between documents of claim 1, wherein;
once the user has transferred the given one of the one or more individual data elements in the linked parsed clipboard content data and positionable pointing device to the given one of the one or more locations for entering data into the given target electronic form, or other target document, using the user interface device associated with the user computing system the given one of the one or more individual data elements is removed from the linked parsed clipboard content data and positionable pointing device.

9. A system for viewing and transferring data between documents comprising:
a user computing system; and
a processor associated with the user computing system for executing at least part of a process for viewing and transferring data between documents, the process for viewing and transferring data between documents comprising:

accessing a source document, the source document including source data; a user selecting at least a portion of the source data in the source document using a user interface device associated with the user computing system;

using the processor associated with the user computing system to copy the selected portion of the source data;

storing data representing the copy of the selected portion of the source data in a data storage means associated with the user computing system;

accessing a given target electronic form, or other target document, the given target electronic form, or other target document, having one or more locations for entering data into the given target electronic form, or other target document;

displaying the given target electronic form, or other target document, on a given user interface screen displayed on a display device associated with the user computing system;

using the processor associated with the user computing system to parse the data representing the copy of the selected portion of the source data into one or more individual data elements, thereby transforming the data representing the copy of the selected portion of the source data into parsed source data;

using the processor associated with a computing system to transform at least part of the parsed source data into parsed clipboard content data including one or more individual data elements;

storing the parsed clipboard content data in the user data storage means associated with the user computing system;

linking the parsed clipboard content data to a positionable pointing device;

displaying the linked parsed clipboard content data and positionable pointing device on the given user interface screen, such that the linked parsed clipboard content data and positionable pointing device and the given target electronic form, or other target document, are simultaneously displayed in the given user interface screen;

the user selecting a given one of the one or more individual data elements in the parsed clipboard content data the user desires to transfer to a given one of the one or more locations for entering data into the given target electronic form, or other target document using a user interface device associated with the user computing system;

the user transferring the given one of the one or more individual data elements in the parsed clipboard content data to the given one of the one or more locations for entering data into the given target electronic form, or other target document using the user interface device associated with the user computing system.

10. The system for viewing and transferring data between documents of claim 9, wherein;

the given target electronic form, or other target document, is accessed through a web-browser that implements at least part of the computing system implemented process for viewing and transferring data between documents.

11. The system for viewing and transferring data between documents of claim 9, wherein;

the given target electronic form, or other target document, is accessed through a website that implements at least part of the computing system implemented process for viewing and transferring data between documents.

12. The system for viewing and transferring data between documents of claim 9, wherein;

the clipboard content data is linked to the positionable pointing device by activating a feature of the positionable pointing device.

13. The system for viewing and transferring data between documents of claim 9, wherein;

the clipboard content data is linked to the positionable pointing device by activating a feature of the clipboard content data.

14. The system for viewing and transferring data between documents of claim 9, wherein;

the data representing the copy of the selected portion of the source data is parsed into one or more individual data elements based on one or more groupings of the source data in the source document.

15. The system for viewing and transferring data between documents of claim 9, wherein; the data representing the copy of the selected portion of the source data is parsed into one or more individual data elements based on the one or more locations for entering data into the given target electronic form, or other target document using the user interface device associated with the user computing system.

16. The system for viewing and transferring data between documents of claim 9, wherein;

once the user has transferred the given one of the one or more individual data elements in the linked parsed clipboard content data and positionable pointing device to the given one of the one or more locations for entering data into the given target electronic form, or other target document, using the user interface device associated with the user computing system the given one of the one or more individual data elements is removed from the linked parsed clipboard content data and positionable pointing device.

* * * * *

UNITED STATES PATENT AND TRADEMARK OFFICE
CERTIFICATE OF CORRECTION

| | | |
|---|---|---|
| PATENT NO. | : 8,171,390 B1 | Page 1 of 1 |
| APPLICATION NO. | : 12/603842 | |
| DATED | : May 1, 2012 | |
| INVENTOR(S) | : Girish Mallenahalley Channakeshava | |

It is certified that error appears in the above-identified patent and that said Letters Patent is hereby corrected as shown below:

On the Title Page, at item (75), replace "Karnataka" with --Bangalore--.

Signed and Sealed this
Twenty-seventh Day of May, 2014

Michelle K. Lee
*Deputy Director of the United States Patent and Trademark Office*